United States Patent
Kitai (10) Patent No.: US 11,964,397 B2
(45) Date of Patent: Apr. 23, 2024

(54) METHOD FOR MOVING TIP OF LINE-LIKE OBJECT, CONTROLLER, AND THREE-DIMENSIONAL CAMERA

(71) Applicant: KURASHIKI BOSEKI KABUSHIKI KAISHA, Okayama (JP)

(72) Inventor: Motoyoshi Kitai, Neyagawa (JP)

(73) Assignee: KURASHIKI BOSEKI KABUSHIKI KAISHA, Okayama (JP)

( * ) Notice: Subject to any disclaimer, the term of this patent is extended or adjusted under 35 U.S.C. 154(b) by 735 days.

(21) Appl. No.: 16/971,679

(22) PCT Filed: Feb. 15, 2019

(86) PCT No.: PCT/JP2019/005611
§ 371 (c)(1),
(2) Date: Aug. 20, 2020

(87) PCT Pub. No.: WO2019/163671
PCT Pub. Date: Aug. 29, 2019

(65) Prior Publication Data
US 2020/0406466 A1    Dec. 31, 2020

(30) Foreign Application Priority Data
Feb. 23, 2018    (JP) .................................. 2018-031263

(51) Int. Cl.
*B25J 9/16* (2006.01)
*B23P 19/04* (2006.01)
(Continued)

(52) U.S. Cl.
CPC ............. *B25J 9/1697* (2013.01); *B23P 19/04* (2013.01); *B25J 9/1612* (2013.01); *B25J 9/1666* (2013.01);
(Continued)

(58) Field of Classification Search
CPC ...... B25J 9/1697; B25J 9/1612; B25J 9/1666; B25J 9/1687; B25J 13/08; B25J 15/00;
(Continued)

(56) References Cited

U.S. PATENT DOCUMENTS 6,141,863 A    11/2000  Hara et al.
8,326,460 B2 *  12/2012  Ban .................... B25J 9/1697
                                                901/47
(Continued)

FOREIGN PATENT DOCUMENTS

CN    101396829    4/2009
CN    101522377    9/2009
(Continued)

OTHER PUBLICATIONS

Machine translation of KR-20230159628-A (Year: 2023).*
(Continued)

*Primary Examiner* — Robert T Nguyen
(74) *Attorney, Agent, or Firm* — JCIPRNET (57) ABSTRACT

The present method for moving a tip of a line-like object is a method for moving a tip of a line-like object grasped by a robot hand to a target position, the method including: measuring a position of the tip of the line-like object grasped by the robot hand; and moving the tip to the target position based on the measured position of the tip.

5 Claims, 10 Drawing Sheets

(51) Int. Cl.
  *B25J 13/08* (2006.01)
  *B25J 15/00* (2006.01)
(52) U.S. Cl.
  CPC ............ *B25J 9/1687* (2013.01); *B25J 13/08* (2013.01); *B25J 15/00* (2013.01); *G05B 2219/37555* (2013.01); *G05B 2219/40082* (2013.01); *G05B 2219/40609* (2013.01)
(58) Field of Classification Search
  CPC ...... B25J 9/1664; B25J 9/1694; B25J 19/023; B23P 19/04; G05B 2219/37555; G05B 2219/40082; G05B 2219/40609; G05B 2219/40028; G05B 2219/45097; G05B 2219/39506; H01R 43/28
  See application file for complete search history.

(56) References Cited

U.S. PATENT DOCUMENTS

| | | |
|---|---|---|
| 2010/0256818 A1 | 10/2010 | Aoba et al. |
| 2011/0153076 A1 | 6/2011 | Noro |
| 2011/0238213 A1 | 9/2011 | Nagasaka et al. |
| 2014/0012416 A1 | 1/2014 | Negishi et al. |
| 2014/0277732 A1 | 9/2014 | Shiota et al. |
| 2017/0151666 A1 | 6/2017 | Kobayashi et al. |
| 2017/0361464 A1 | 12/2017 | Sasaki |
| 2018/0122535 A1 | 5/2018 | Niu et al. |
| 2020/0290206 A1* | 9/2020 | Mukou .................. B25J 19/023 |
| 2022/0016764 A1* | 1/2022 | Yoshida .................. B25J 9/1653 |
| 2023/0124687 A1* | 4/2023 | Yoshimura ......... G02B 23/2484 348/65 |

FOREIGN PATENT DOCUMENTS

| | | | |
|---|---|---|---|
| CN | 101842195 | | 9/2010 |
| CN | 102198659 | | 9/2011 |
| CN | 103459102 | | 12/2013 |
| CN | 105051488 | | 11/2015 |
| JP | 2011131300 | | 7/2011 |
| JP | 2012200805 | | 10/2012 |
| JP | 2014176917 | | 9/2014 |
| JP | 2016192138 | | 11/2016 |
| JP | 2017094471 | | 6/2017 |
| JP | 2017226029 | | 12/2017 |
| KR | 20230159628 | A  * | 11/2023 |
| WO | 9817444 | | 4/1998 |
| WO | 2014149706 | | 9/2014 |

OTHER PUBLICATIONS

1 Office Action of Japan Counterpart Application, with English translation thereof, dated Aug. 16, 2022, pp. 1-13.
"Office Action of Taiwan Counterpart Application" with English translation thereof, dated Aug. 30, 2021, p. 1-p. 11.
"International Search Report (Form PCT/ISA/210) of PCT/JP2019/005611," dated May 21, 2019, with English translation thereof, pp. 1-4.
Haruo Kitaaki, et al., "Development of robot vision system that can handle flexible objects," The 29th Annual Conference of the Robotics society of Japan, with English translation thereof, Sep. 2011, pp. 1-11.
"Office Action of China Counterpart Application", dated Feb. 13, 2023, with English translation thereof, p. 1-p. 16.
Hirofumi Nakagaki et al., "Study of Insertion Task of a Flexible Wire into a Hole by Using Visual Tracking Observed by Stereo Vision", Proceedings of the 1996 International Conference on Robotics and Automation, Minneapolis, Apr. 1996, pp. 3209-3214.
"Search Report of Europe Counterpart Application", dated Nov. 12, 2021, pp. 1-10.
"Office Action of Japan Counterpart Application", dated Aug. 29, 2023, with English translation thereof, p. 1-p. 14.

* cited by examiner

METHOD FOR MOVING TIP OF LINE-LIKE OBJECT, CONTROLLER, AND THREE-DIMENSIONAL CAMERA

CROSS-REFERENCE TO RELATED APPLICATION

This application is a 371 application of the International PCT application serial no. PCT/JP2019/005611, filed on Feb. 15, 2019, which claims the priority benefits of Japan Patent Application No. 2018-031263, filed on Feb. 23, 2018. The entirety of each of the above-mentioned patent applications is hereby incorporated by reference herein and made a part of this specification.

TECHNICAL FIELD

The present invention relates to a method for moving a tip of a line-like object when the line-like object is grasped using a robot hand, a controller, and a three-dimensional camera.

BACKGROUND ART

Robots have been pervasive each of which recognizes a target object using a three-dimensional camera or the like and autonomously grasps the target object. For grasping of a line-like object, for example, Japanese Patent Laying-Open No. 2014-176917 (PTL 1) discloses a robot device that performs an operation of assembling a line-like object, wherein the line-like object has one fixed end and is grasped in the vicinity of the fixed end, and the grasped portion is then slid in a predetermined trajectory to move to the other end. This makes it possible to quickly grasp the other end while it is difficult to precisely estimate the other end due to a curl or the like in an electric wire serving as an exemplary line-like object.

Japanese Patent Laying-Open No. 2016-192138 (PTL 2) discloses inventions relating to a method for manufacturing a wire harness and an image processing method. In a process for manufacturing a wire harness, a processing position specifying process is performed to specify a processing position by measuring a three-dimensional shape of an electric wire assembly.

CITATION LIST

Patent Literature

PTL 1: Japanese Patent Laying-Open No. 2014-176917
PTL 2: Japanese Patent Laying-Open No. 2016-192138

SUMMARY OF INVENTION

Technical Problem

It is considered to perform control to hold an electric wire or the like as a line-like object using a robot hand and move the tip of the electric wire to a predetermined target position, for example. For example, control to insert the tip of the electric wire into a through hole provided in a target object is considered. The robot hand recognizes that the line-like object extends straight from the region grasped by the robot hand toward the tip side.

However, actually, it is considered that the line-like object may be curved from the region grasped by the robot hand toward the tip side. In such a case, after recognizing the tip position of the line-like object, the tip of the electric wire needs to be moved into the through hole provided in the target object by moving the robot hand.

The present invention has an object to solve the above-described problem and relates to a method for moving a tip of a line-like object when the line-like object is held by a robot hand, a controller, and a three-dimensional camera.

Solution to Problem

The present method for moving a tip of a line-like object is a method for moving a tip of a line-like object grasped by a robot hand to a target position, the method including: measuring a position of the tip of the line-like object grasped by the robot hand; and moving the tip to the target position based on the measured position of the tip.

In another embodiment, the measuring of the position of the tip further includes measuring an orientation of the tip.

In another embodiment, the moving of the tip to the target position includes matching the orientation of the tip with a predetermined orientation.

In another embodiment, the orientation of the tip is determined based on a shape of the line-like object from the tip to a position of the line-like object at a predetermined distance.

In another embodiment, in the moving of the tip to the target position, the target position is a hole.

In another embodiment, the moving of the tip to the target position includes moving the tip to pass through a predetermined front position with an orientation of the tip at the front position being matched with a predetermined orientation.

The present controller is a controller for controlling movement of a line-like object by a robot hand provided in a robot, wherein the controller obtains a three-dimensional shape of the line-like object from a three-dimensional camera that obtains the three-dimensional shape of the line-like object, the controller obtains a position of a tip of the line-like object from the three-dimensional shape, and the controller notifies, to the robot having the robot hand, information for moving the tip to a target position, based on the position of the tip of the line-like object.

In another embodiment, the controller measures an orientation of the tip of the line-like object from the three-dimensional shape of the line-like object, and the controller notifies, to the robot having the robot hand, information for moving the tip of the line-like object to the target position with the orientation of the tip of the line-like object being matched with a predetermined orientation.

The present three-dimensional camera is a three-dimensional camera that obtains a three-dimensional shape of a line-like object, the three-dimensional camera being used to control movement of the line-like object by a robot hand provided in a robot, the three-dimensional camera including a controller, wherein the controller obtains the three-dimensional shape of the line-like object from the three-dimensional camera, the controller obtains a position of a tip of the line-like object from the three-dimensional shape, and the controller notifies, to the robot having the robot hand, information for moving the tip to a target position, based on the position of the tip of the line-like object.

Advantageous Effects of Invention

According to each of the method for moving the tip of the line-like object, the controller, and the three-dimensional camera, even when the line-like object is curved from its region grasped by the robot hand toward the tip side, the tip position of the line-like object can be recognized and then the tip of the line-like object can be moved into a through hole provided in a target object by moving the robot hand.

DESCRIPTION OF EMBODIMENTS

The following describes a method for measuring an amount of curve of a tip according to an embodiment of the present invention with reference to figures. In the embodiment described below, when referring to the number, amount, and the like, the scope of the present invention is not necessarily limited to the number, amount, and the like unless otherwise described particularly. The same or corresponding components are given the same reference characters, and may not be described repeatedly. It is originally expected to appropriately combine and use configurations in the embodiment. In the figures, components are not described in actual size ratios and parts of the components are shown in different size ratios in order to facilitate understanding of structures.

The following describes a case where an electric wire is used as an exemplary line-like object, but the line-like object is not limited to the electric wire. The line-like object in this description may be any object as long as the object has an elongated shape. Examples of the line-like object include an electric wire, a wire harness, a solder, a cord, a thread, a fiber, a glass fiber, an optical fiber, a tube, a dry noodle, and the like. The electric wire is not limited to an electric wire in which thin wires are bundled, and includes an electric wire constituted of a single wire. In particular, in the case of a line-like object that may be changed in shape due to occurrence of deflection or the like or in the case of a non-straight line-like object, the effect of the present embodiment is exhibited more noticeably.

(Related Art: Line-Like Object Grasping Method and Controller)

The following describes exemplary line-like object grasping method and controller as related art with reference to FIG. 1 to FIG. 8.

Figure 1:
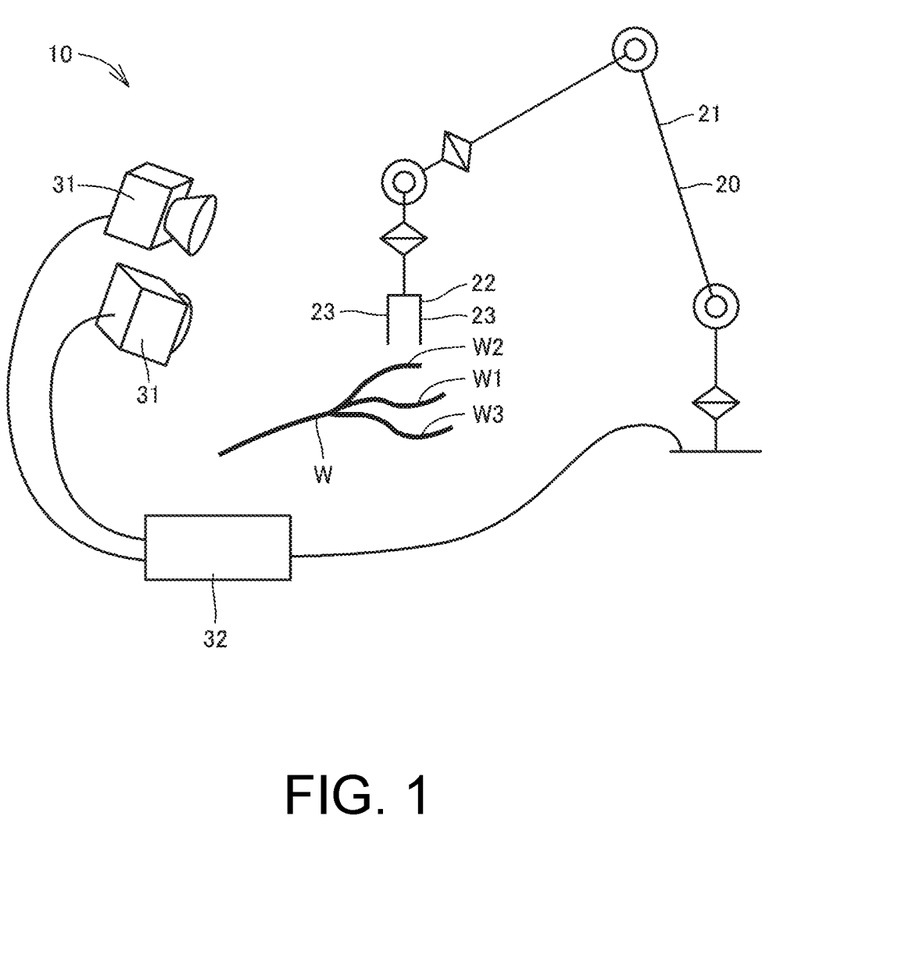
FIG. 1 is a diagram showing an overall system for performing a line-like object grasping method in a related art.

In FIG. 1, an overall system 10 for performing the line-like object grasping method has a robot 20, a three-dimensional camera 31, and a controller 32. A wire harness W including an electric wire W1, an electric wire W2, and an electric wire W3 is disposed in a working space.

As robot 20, a known articulated robot can be suitably used. A robot hand 22 is provided at the tip of an arm 21 of the robot. A line-like object is grasped by a pair of grasping portions 23 of the robot hand.

Three-dimensional camera 31 is not particularly limited as long as three-dimensional camera 31 can measure the three-dimensional shapes of electric wire W1, electric wire W2, and electric wire W3. A stereo camera is preferably used. The stereo camera is preferable to measure the three-dimensional shape of a line-like object at a high speed.

The stereo camera includes two cameras, determines a corresponding point for a point to be measured on each of two images captured from different viewpoints, and calculates a three-dimensional position of the measured point by way of the triangulation principle in accordance with a positional relation between the two cameras. Regarding three-dimensional measurement of a line-like object by way of the stereo method, for example, Japanese Patent Laying-Open No. 2-309202 describes that images of a multiplicity of line-like objects are captured by two cameras, and a corresponding point is determined by checking inclinations of emission lines and a distance between the emission lines in two images as features. In this way, a process time required to determine the corresponding point can be reduced.

In the stereo method, an epipolar line represents a straight line obtained by projecting a straight line connecting between viewpoint and measurement point of one image onto the other image (see Japanese Patent Application No. 2017-221045). A corresponding point on the other image corresponding to a point on the one image is certainly projected on the epipolar line on the other image.

In order to determine a corresponding point for a certain point on the line-like object by utilizing the above, an intersection point between the line-like object and the epipolar line on the other image is determined, with the result that the three-dimensional shape of the line-like object can be measured at a high speed. When line-like objects are provided with different colors for the sake of distinction, a color camera can be used to extract a corresponding color from an image and then a corresponding point is determined, with the result that the three-dimensional shape of each line-like object can be determined at a higher speed.

Controller 32 communicates with three-dimensional camera 31 through a communication unit (not shown) to obtain the three-dimensional shapes of electric wire W1, electric wire W2, and electric wire W3 from the stereo camera. Based on the three-dimensional shapes obtained from the stereo camera, the controller determines, using a calculation unit (not shown), whether or not robot hand 22 interferes with another line-like object when grasping a line-like object, and performs various types of calculations for determining a target line-like object to be grasped.

Via the communication unit, the controller notifies, to robot 20, the grasping position of the target line-like object to be grasped, based on the calculation results. In addition to directly notifying the grasping position to robot 20, the grasping position may be notified to a different device (for example, a robot controller or a personal computer for control), provided between controller 32 and robot 20, for controlling an operation of the robot.

Figure 2:
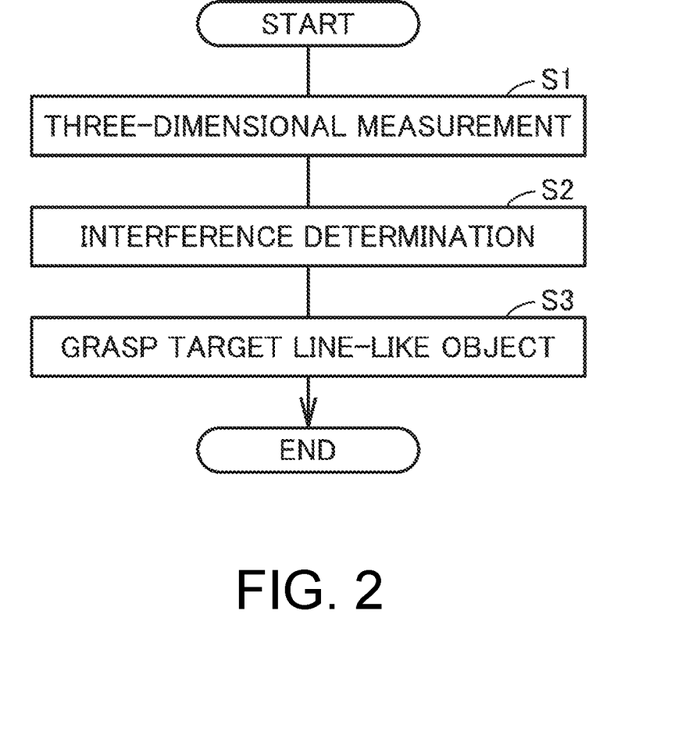
FIG. 2 is a process flow diagram of the line-like object grasping method in the related art.

The line-like object grasping method according to the related art will be described below with reference to FIG. 2. The line-like object grasping method according to the related art includes: a step (S1) of measuring the three-dimensional shapes of the plurality of electric wires W1, W2, W3; a determination step (S2) of determining, based on the measured three-dimensional shapes, whether or not robot hand 22 interferes with the other line-like objects when robot hand 22 grasps a line-like object; and a step (S3) of grasping a target line-like object determined based on the determination result in determination step S2.

Step S1 of measuring the three-dimensional shapes of the plurality of electric wires W1, W2, W3 is performed by three-dimensional camera 31. The stereo camera captures images of the working space having the line-like objects therein, and performs a calculation process for two images to obtain each of the three-dimensional shapes of electric wire W1, electric wire W2, and electric wire W3. Each of the three-dimensional shapes of the line-like objects is represented in an orthogonal coordinate system or an oblique coordinate system. Each of the three-dimensional shapes of the line-like objects is preferably represented in the orthogonal coordinate system.

Determination step S2 is performed by controller 32. Details of the determination step will be described later.

Step S3 of grasping the target line-like object is performed by robot 20. Controller 32 notifies, to the robot, the grasping position of the target line-like object to be grasped, and the robot moves robot arm 21 and robot hand 22 to perform a grasping operation.

The following describes determination step S2 in detail.

Figure 3:
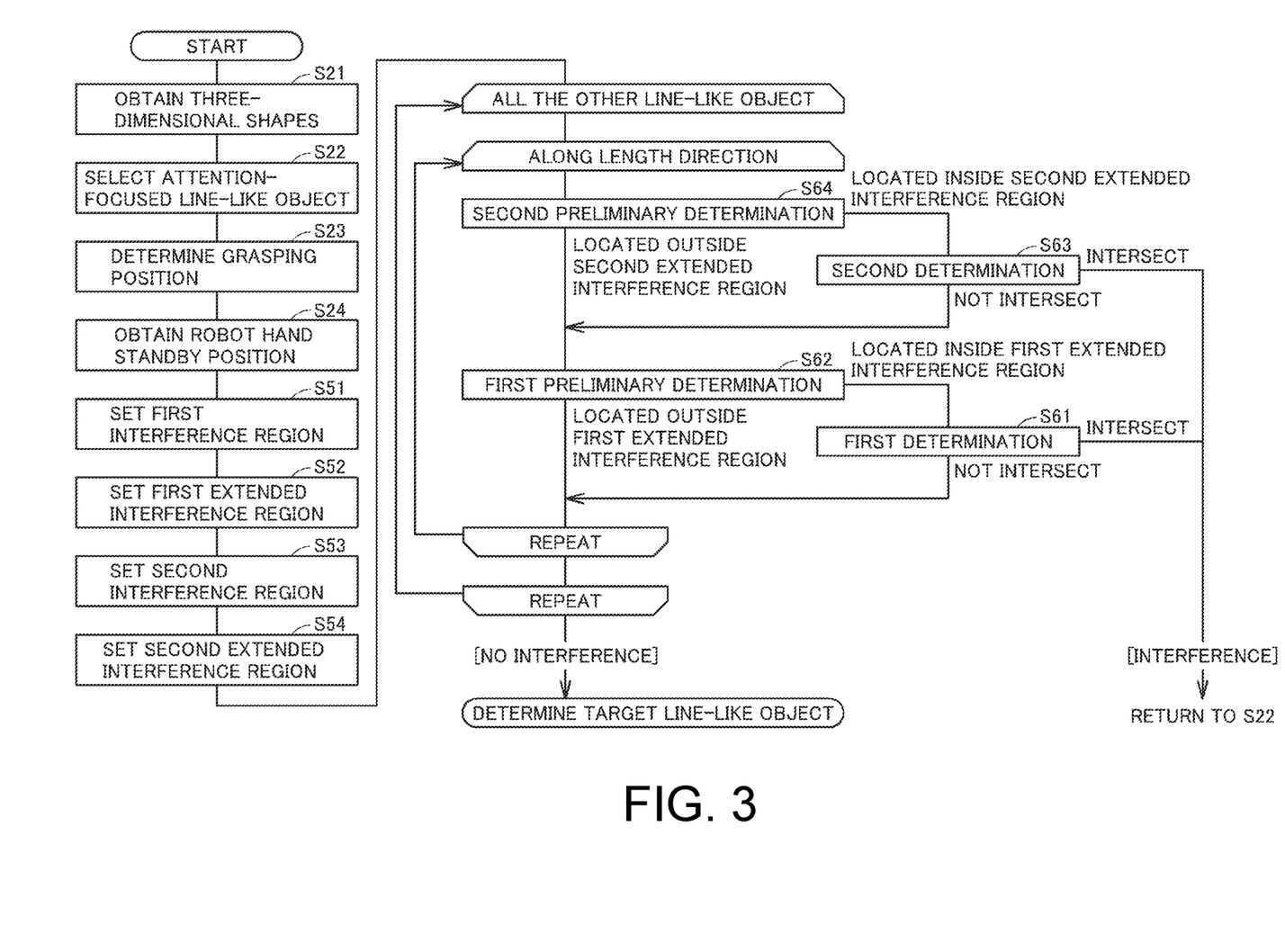
FIG. 3 is a process flow diagram of a determination step of the line-like object grasping method in the related art.

Referring to FIG. 3, in determination step S2 of the related art, the following operations are performed: obtaining the three-dimensional shapes of the line-like objects (S21); selecting an attention-focused line-like object (S22); determining a grasping position of the attention-focused line-like object (S23); obtaining a robot hand standby position (S24); setting various types of interference regions (S51 to S54); and performing various types of interference determinations (S61 to S64).

First, controller 32 obtains the three-dimensional shapes of electric wire W1, electric wire W2, and electric wire W3 from three-dimensional camera 31 (S21).

Next, controller 32 selects an attention-focused line-like object to be grasped by robot hand 22 (S22). In the description below, electric wire W1 is regarded as the attention-focused line-like object to be grasped, and electric wires W2, W3 are regarded as line-like objects (other line-like objects) other than the attention-focused line-like object. The controller may receive a designation of color or the like of an electric wire from the outside, and may determine an attention-focused line-like object based on the designation. Preferably, the controller autonomously selects an attention-focused line-like object (see Japanese Patent Application No. 2017-221045).

For example, when electric wire W1, electric wire W2, and electric wire W3 are placed on a stage, a line-like object at the highest position, i.e., the uppermost line-like object can be selected as the attention-focused line-like object based on the obtained three-dimensional shapes. This is due to the following reason: even in the case where the line-like objects are placed to overlap with one another, when grasping a line-like object at a higher position, robot hand 22 is less likely to interfere with the other line-like objects.

Next, controller 32 determines a grasping position of electric wire W1 on which attention is to be focused (S23). For example, the controller calculates the grasping position of the attention-focused line-like object as three-dimensional coordinates based on a predetermined condition such as designation of several mm from the tip of the attention-focused line-like object.

Next, controller 32 obtains the standby position of robot hand 22 (S24). When the standby position of robot hand 22 is determined in advance, the coordinates thereof are obtained as the standby position. When the standby position is determined based on the three-dimensional shape of the line-like object, for example, when the standby position is determined to be located above the line-like object by a predetermined distance, the standby position is obtained by calculation.

Controller 32 obtains the current position of robot hand 22 from robot 20. When the current position of robot hand 22 is different from the standby position, controller 32 moves robot hand 22 to the standby position. A line segment that connects the standby position of robot hand 22 to the grasping position of electric wire W1 provides a substantial movement path when robot hand 22 performs a grasping operation.

Next, controller 32 sets some interference regions including the grasping position of the attention-focused line-like object for the purpose of interference determination between robot hand 22 and each of the other electric wires W2, W3. In FIG. 3, a first interference region, a first extended interference region, a second interference region, and a second extended interference region are set in this order. For each of all the other line-like objects, interference determination is performed to determine whether or not the other line-like object is included in any of the interference regions.

The interference determination for each of the line-like objects can be performed in the following manner: while shifting a point or line segment on the line-like object in the length direction, determination is made as to whether the point exists in an interference region or the line segment intersects the interference region. In FIG. 3, a second preliminary determination for the second extended interference region, a second determination for the second interference region, a first preliminary determination for the first extended interference region, and a first determination for the first interference region are performed in this order. Hereinafter, the interference regions and the interference determinations for the regions will be described in an order different from the order shown in FIG. 3.

Figure 4:
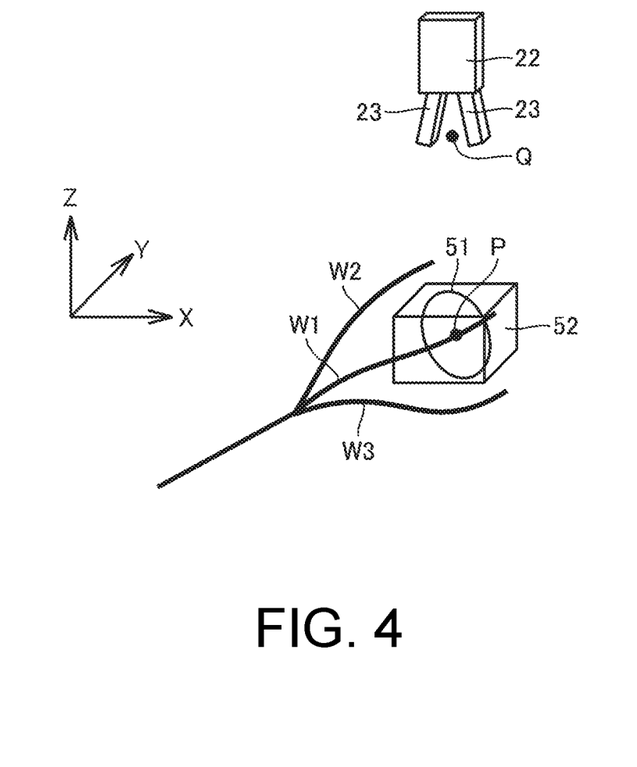
FIG. 4 is a diagram showing a first interference region and a first extended interference region in the related art.

Referring to FIG. 4, in first determination step S61 for first interference region 51, it is determined whether or not robot hand 22 interferes with the other electric wires W2, W3 when grasping electric wire W1.

First interference region 51 is a planar region that includes a grasping position P of electric wire W1 and that has a predetermined shape and a predetermined size. The first interference region preferably includes grasping position P at its center. The shape of the first interference region is not particularly limited, but is preferably a polygonal shape, a circular shape, or an elliptical shape. When the first interference region has a polygonal shape, the first interference region preferably has a quadrangular shape, and more preferably has a square shape. This is because a calculation load is reduced and the determination can be performed at a high speed. When the first interference region has a polygonal shape, the first interference region is particularly preferably represented by a square having sides parallel to a plane formed by any two axes of the coordinate system representing the three-dimensional shape of the line-like object (hereinafter, simply referred to as "coordinate system").

This is because the first extended interference region described below can be made smaller to improve efficiency of the first preliminary determination. When the first interference region does not have a polygonal shape, the first interference region preferably has a circular shape. This is also because the calculation load is reduced and the determination can be performed at a high speed.

Figure 6:
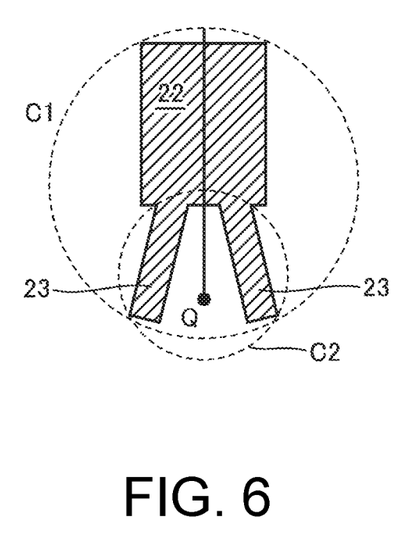
FIG. 6 is a diagram for illustrating the size of the first interference region in the related art.

An excessively large size of first interference region 51 leads to an increased probability of erroneously determining that there is interference even though there is no interference actually. Referring to FIG. 6, when it is assumed that a circle C1 represents the minimum circle that circumscribes the maximum cross section of robot hand 22, the first interference region preferably has a size included in a circle having a diameter 2.0 times as large as the diameter of C1, and more preferably has a size included in a circle having the same size as that of circle C1.

On the other hand, an excessively small size of the first interference region leads to an increased probability of erroneously determining that there is no interference even though there is interference actually. Referring to FIG. 6, when it is assumed that a circle C2 represents the minimum circle that circumscribes the maximum cross section of grasping portions 23 operated by robot hand 22 to grasp the line-like object, the first interference region preferably has a size that can include a circle having the same size as that of circle C2 (see Japanese Patent Application No. 2017-221045).

First interference region 51 is preferably orthogonal to electric wire W1. The expression "the first interference region is orthogonal to the attention-focused line-like object" means that a direction in which the attention-focused line-like object extends forms a right angle with respect to the first interference region at grasping position P. First interference region 51 is preferably orthogonal to electric wire W1 because an equation for the plane including the first interference region is readily determined. First interference region 51 is preferably orthogonal to electric wire W1 also because line-like objects are often grasped by robot hand 22 from exactly beside the line-like objects, i.e., in a direction of right angle with respect to each of the line-like objects. First interference region 51 is preferably orthogonal to electric wire W1 also because when another line-like object exists in the first interference region orthogonal to the attention-focused line-like object, robot hand 22 is highly likely to interfere with the other line-like object even if robot hand 22 does not grasp the attention-focused line-like object from exactly beside the attention-focused line-like object.

Figure 7:
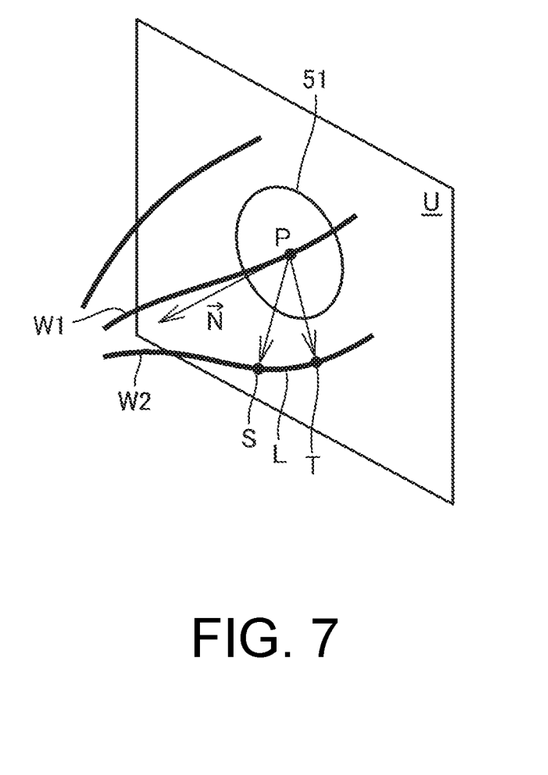
FIG. 7 is a diagram for illustrating a first determination step in the related art.

Referring to FIG. 7, first determination step S61 can be performed by performing intersection determination to determine whether or not line segment L on the other electric wire W2 of interest intersects first interference region 51. Line segment L can be a line segment between two adjacent points S, T of a group of points representing the three-dimensional shape of electric wire W2. When line segment L intersects the first interference region, a point on line segment L is included in the first interference region. The intersection determination can be performed by a known method. For example, line segment L intersects a plane U including first interference region 51 when respective signs of the following two inner products are different: an inner product of a normal vector N of plane U and a vector PS from grasping position P to end S of line segment L; and an inner product of normal vector N of plane U and a vector PT from grasping position P to end T of line segment L. When line segment L and plane U intersect with each other, it is determined whether or not an intersection therebetween is located within first interference region 51.

Referring to FIG. 4, first preliminary determination step S62 for first extended interference region 52 is performed prior to the first determination, and is performed in order to find, by calculation at a higher speed, a case where robot hand 22 do not interfere with the other electric wires W2, W3.

First extended interference region 52 is a spatial region including first interference region 51. The shape and size of the first extended interference region are not particularly limited. As the first extended interference region, it is preferable to set the smallest hexahedron of hexahedrons that each include the first interference region and that each have all the sides parallel to any axes of the coordinate system. When the coordinate system is an orthogonal coordinate system, this hexahedron is a rectangular parallelepiped. In this way, the first preliminary determination can be performed only by comparing the magnitudes of the coordinates.

Figure 8:
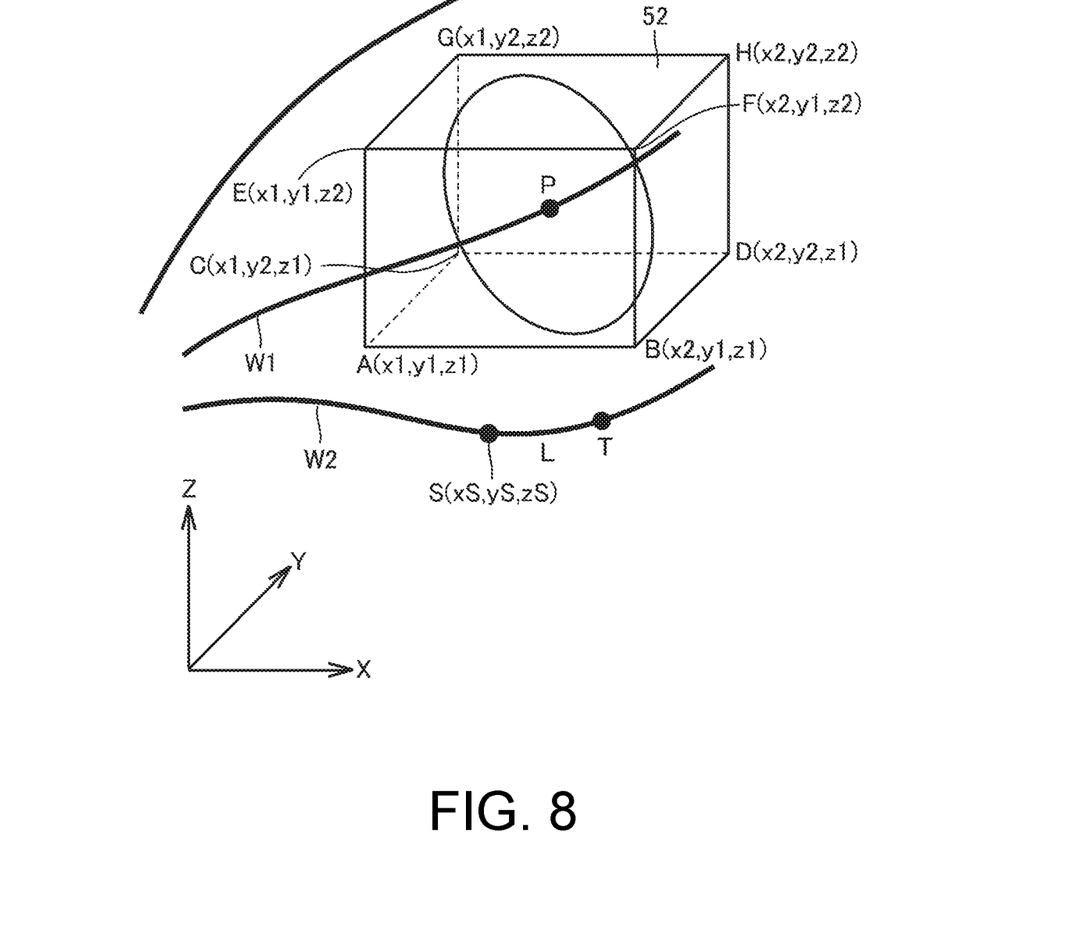
FIG. 8 is a diagram for illustrating a first preliminary determination step in the related art.

Specifically, referring to FIG. 8, assuming that the coordinates of eight apexes A to H of first extended interference region 52 are as shown in FIG. 8 and the coordinates of one end point S of line segment L are (xS, yS, zS), point S is located inside the first extended interference region when $x1 \leq xS \leq x2$, $y1 \leq yS \leq y2$, and $z1 \leq zS \leq z2$. Otherwise, point S is located outside the first extended interference region.

Since first extended interference region 52 includes first interference region 51, the first determination can be omitted when a result indicating that the hand does not interfere with the other line-like objects is obtained by the first preliminary determination.

Figure 5:
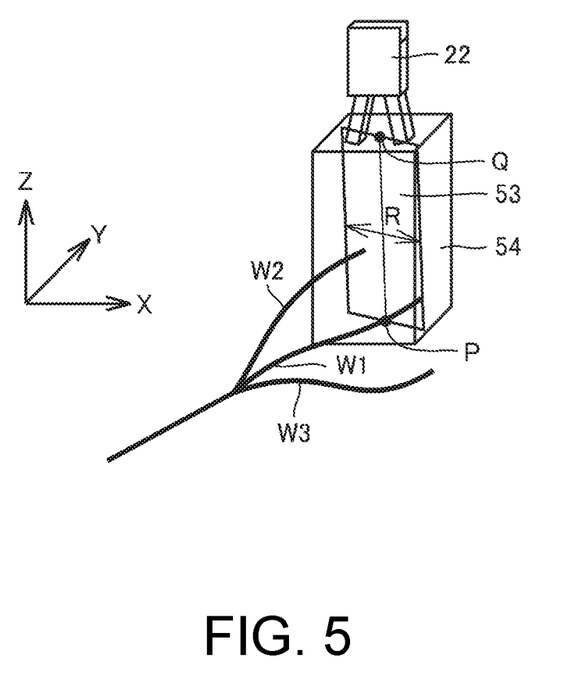
FIG. 5 is a diagram showing a second interference region and a second extended interference region in the related art.

Referring to FIG. 5, in the second determination step (S63) for second interference region 53, it is determined whether or not robot hand 22 interferes with the other electric wires W2, W3 in the path in which robot hand 22 moves to grasping position P of electric wire W1.

Second interference region 53 is a planar region that includes a line segment PQ connecting grasping position P of electric wire W1 to standby position Q of robot hand 22 and that extends laterally with respect to line segment PQ to have a predetermined width R. The second interference region preferably includes line segment PQ at its center in the width direction. The shape of the second interference region is not particularly limited, but preferably has a rectangular shape or a parallelogram shape, and is more preferably a rectangular shape having line segment PQ as an axis of line-symmetry. This is because the calculation load is reduced and the determination is made at a higher speed.

An excessively large width of second interference region 53 leads to an increased probability of erroneously determining that there is interference even though there is no interference actually. The width of the second interference region is preferably equal to or less than the diameter of circle C1 in FIG. 6. On the other hand, an excessively small width of the second interference region leads to an increased probability of erroneously determining that there is no interference even though there is interference actually (see Japanese Patent Application No. 2017-221045). The width of the second interference region is preferably equal to or more than the diameter of circle C2 in FIG. 6.

Second interference region 53 is preferably set to attain a maximum intersection angle with respect to electric wire W1. This is because when robot hand 22 approaches electric wire W1, grasping portions 23, 23 often travel within such a plane.

As with first determination step S61, second determination step S63 can be performed by performing intersection determination to determine whether line segment L on the other electric wire W2 of interest intersects second interference region 53.

The second preliminary determination step (S64) for second extended interference region 54 is performed prior to the second determination in order to find, by calculation at a higher speed, a case where robot hand 22 does not interfere with the other electric wires W2, W3.

Second extended interference region 54 is a spatial region including second interference region 53. The shape and size of the second extended interference region are not particularly limited. As the second extended interference region, it is preferable to set the smallest hexahedron of hexahedrons that each include the second interference region and that each have all the sides parallel to any axes of the coordinate system. When the coordinate system is an orthogonal coordinate system, this hexahedron is a rectangular parallelepiped. In this way, the second preliminary determination can be performed only by comparing the magnitudes of the coordinates.

Since second extended interference region 54 includes second interference region 53, the second determination can be omitted when a result indicating that the hand does not interfere with the other line-like objects is obtained by the second preliminary determination.

When the interference determination for the other electric wire W2 is completed by repeating determination steps S61 to S64 while shifting line segment L for the determination in the length direction of electric wire W2, the same process is performed for the next other electric wire W3.

When it is determined that all the other electric wires W2, W3 are not included in interference regions 51 to 54, controller 32 determines that there is no interference with the other line-like objects when the grasping position of electric wire W1 is grasped by robot hand 22. Thereafter, electric wire W1 is regarded as a target line-like object and the grasping position of electric wire W1 is notified to robot 20.

When it is determined that line segment L is included in the first interference region or the second interference region in one of the first determination and the second determination, controller 32 determines that there is interference with the other line-like object when the grasping position of electric wire W1 is grasped by robot hand 22. Subsequent determination steps are not performed and the process returns to step S22. The attention-focused line-like object is changed and the same process is repeated. When controller 32 autonomously selects the next attention-focused line-like object, a line-like object at the next highest position can be selected as the attention-focused line-like object based on the three-dimensional shapes of electric wires W1 to W3 previously obtained from three-dimensional camera 31, for example.

When it is determined that there is "interference" with another line-like object whichever line-like object attention is focused on, a positional relation between the line-like objects may be changed by turning the whole of the line-like objects to change the orientations of the line-like objects or by shaking or vibrating the line-like objects, and then each step may be performed again. With distances from the grasping positions of the respective attention-focused line-like objects to the other line-like objects closest thereto being calculated as interference distances, a line-like object with the longest interference distance may be grasped first. In this way, the robot can be instructed to perform the grasping operation in an order in which the grasping is more likely to succeed. Each of the interference distances can be simply calculated by using the distance to the grasping position from the intersection between the first or second interference region and the other line-like object in the interference determination.

As described above, according to the line-like object grasping method according to the related art, the grasping operation is performed based on the result of determination as to whether or not the line-like object interferes with the other line-like objects. Hence, one line-like object can be selected from the plurality of line-like objects and then can be grasped by robot hand 22 (see Japanese Patent Application No. 2017-221045).

Whether or not robot hand 22 interferes with another line-like object may be determined by calculating whether or not there is an intersection with the polyhedron using CAD data on the robot hand 22 side and the three-dimensional shape data of the line-like object. This method is excellent in precision of determination, but is a time-consuming process.

In this related art, whether or not a line-like object other than the attention-focused line-like object exists in the first interference region can be determined by performing the intersection determination to determine whether or not there is an intersection between the planar first interference region and the line-like object. Hence, whether or not there is interference can be determined at a high speed with a small amount of calculation. When no line-like object other than the attention-focused line-like object exists in the first interference region, robot hand 22 is highly likely to be able to grasp the attention-focused line-like object without interfering with the other line-like objects. The same applies to the second interference region.

An order in which the determination steps are performed is not particularly limited except that the first preliminary determination is performed prior to the first determination and the second preliminary determination is performed prior to the second determination. Although the second determination step is performed and then the first determination step is performed in the above embodiment, the order may be reversed. In the related art described above, all the determination steps are performed for each line segment while shifting line segment L in the length direction of the line-like object. However, after finishing one determination step (for example, the second preliminary determination step) for a certain line-like object, another determination step (for example, the second determination step) may be performed onto the same line-like object.

In the related art described above, the attention-focused line-like object is selected (S22) before obtaining the standby position of robot hand 22 (S24); however, the standby position of robot hand 22 may be obtained and then the attention-focused line-like object may be selected based on the standby position. In this case, a line-like object closest to the standby position can be selected as the attention-focused line-like object. As the line-like object closest to the standby position, there may be selected a line-like object having the shortest distance between the coordinates of the standby position and the coordinates of the grasping position of the line-like object. This is preferable because it is possible to preferentially select a line-like object for which robot hand 22 is unlikely to interfere with the other line-like objects when grasping it.

A posture (grasping posture) of robot hand 22 when grasping a line-like object is preferably such that each grasping portion and the line-like object form a substantially right angle. This is due to the following reason: when the orientation of the line-like object on the tip side relative to the grasping position is substantially perpendicular to the grasping portion, the robot can be readily controlled when inserting the line-like object into the processing machine or the like after grasping. Preferably, in the standby position, the posture of robot hand 22 is adjusted to attain such an orientation that the grasping portion and the line-like object forms a right angle when grasping. Thereafter, robot hand 22 moves along the second interference region from the standby position toward the grasping position. Accordingly, the posture of robot hand 22, the movement direction of robot hand 22, and the orientations of the planes of the first and second interference regions match with one another, thereby attaining high-precision interference determination.

Robot hand 22 grasping a line-like object according to the present invention may convey the line-like object to each of various manufacturing devices and processing devices. For example, the tip of a grasped electric wire may be moved by robot hand 22 and may be inserted into a coating stripping machine, a terminal crimping device, or the like. Robot hand 22 may be used in a process of manufacturing a wire harness by inserting the tip of an electric wire into each of various types of components such as a connector.

(Embodiments: Method for Moving Tip of Line-Like Object, Controller, and Three-Dimensional Camera)

Next, the following discusses a case where robot hand 22 provided in robot 20 as described above conveys a line-like object to each of various manufacturing devices or processing devices. Specifically, controller 32 (see FIG. 1) controls movement of line-like object W1 by robot hand 22 provided in robot 20. Controller 32 is intended to: obtain the three-dimensional shape of line-like object W1 from three-dimensional camera 31 that obtains the three-dimensional shape of line-like object W1; obtain the position of the tip of line-like object W1 from the three-dimensional shape; and notify, to robot 20 having robot hand 22, information for moving tip W1s of line-like object W1 to a target position based on the position of tip W1s.

Overall system 10 shown in FIG. 1 includes robot 20 having robot hand 22, three-dimensional camera 31, and controller 32. Controller 32 may be any one of: a controller independent of robot 20 and three-dimensional camera 31; a controller included in robot 20; and a controller included in three-dimensional camera 31.

As described above, the posture (grasping posture) of robot hand 22 when grasping a line-like object is preferably such that the grasping portion and the line-like object forms a substantially right angle. However, when a line-like object having a certain degree of flexibility is used, the tip side of the line-like object grasped by robot hand 22 may not extend straight and may be curved.

In such a case, if robot hand 22 conveys the line-like object without recognizing the curve of the tip side of the line-like object, the tip of the line-like object cannot be conveyed to a predetermined target position.

Therefore, controller 32 may measure an orientation of the tip of the line-like object based on the three-dimensional shape of the line-like object, and notify, to the robot having the robot hand, information for moving the tip of the line-like object to the target position with the orientation of the tip of the line-like object being matched with a predetermined orientation.

In an embodiment below, the following describes a method for measuring an amount of curve of the tip of the line-like object when robot hand 22 grasping the line-like object conveys the line-like object to the predetermined position. As one example of conveyance to the predetermined position, the following describes a case where tip W1s of electric wire W1 serving as the line-like object is inserted into a hole TGH provided in a target TG.

Here, the diameter of the line-like object may fall within a range that can be recognized by the three-dimensional camera, and is preferably 0.01 mm to 10 cm. Hole TGH provided in target TG may have any size as long as the line-like object can be inserted therein, and preferably has a diameter of 0.01 mm to 15 cm and preferably has a hole depth twice or more as large as the diameter of the line-like object.

Figure 9:
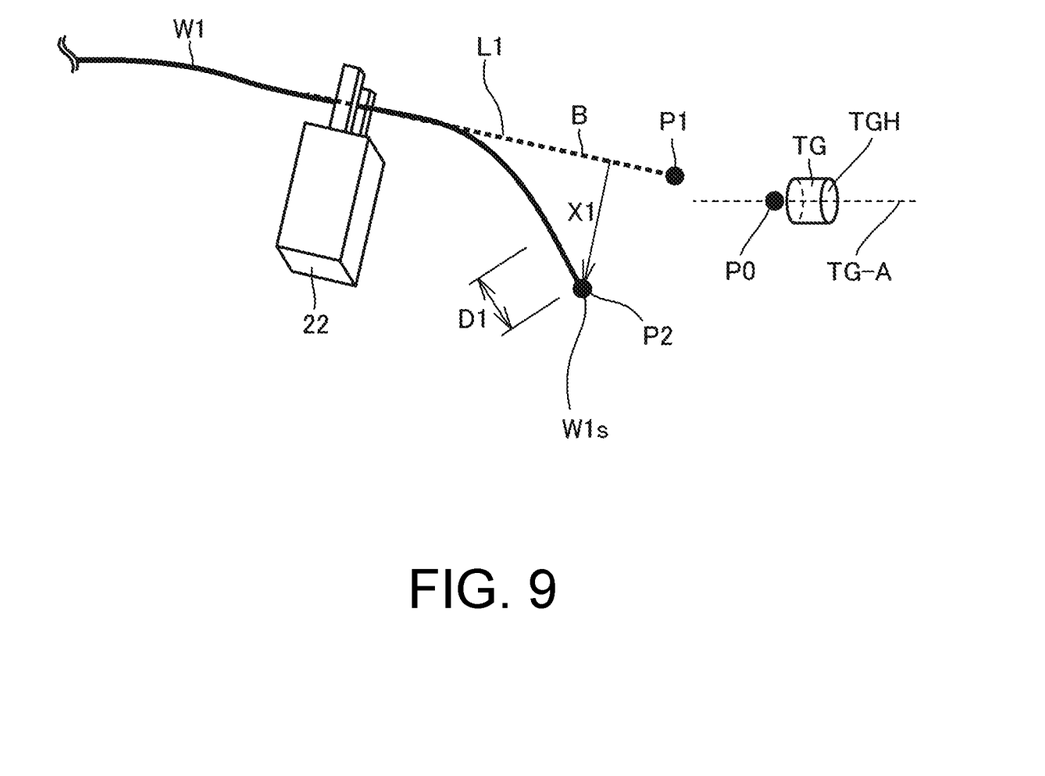
FIG. 9 is a schematic diagram illustrating a method for moving a tip of a line-like object in an embodiment.

FIG. 9 shows a state in which electric wire W1 is grasped by robot hand 22. Further, tip W1s of electric wire W1 does not extend to form a substantially right angle with respect to robot hand 22 and is curved.

The position of tip W1s of electric wire W1 grasped by robot hand 22 is measured. On this occasion, assuming that L1 represents a direction extending at a substantially right angle with respect to robot hand 22, an amount of curve of the tip may be measured. The amount of curve of the tip indicates how tip W1s of electric wire W1 is deviated with respect to L1. In the measurement of the position of tip W1s, the three-dimensional shape can be measured using three-dimensional camera 31 described above. In this way, the position of tip W1s and a deviation amount X1 can be recognized.

Further, a direction in which the tip of electric wire W1 extends can be determined by measuring a shape of electric wire W1 from tip W1s to a position at a predetermined distance (distance D1 in FIG. 9) and determining a mean vector. For the orientation of the tip, there may be employed a vector connecting tip W1s of electric wire W1 to a position with an insertion length from tip W1s to the hole.

This makes it possible to determine an orientation of an appropriate posture when inserting tip W1s into hole TGH provided in target TG. The predetermined distance (distance D1 in FIG. 9) from tip W1s of electric wire W1 is preferably 0.3 to 10 times as large as the hole depth of hole TGH provided in target TG, and is more preferably 0.5 to 5 times as large as the hole depth of hole TGH provided in target TG. With the amount of curve from the tip being measured, D1 may be determined to span to a point at which the curve is changed steeply. Next, when the measurement of the position of tip W1s of electric wire W1 and the measurement of the amount of curve of the tip are finished, the position and the amount of curve of the tip are fed back for control of movement of robot hand 22.

As shown in FIG. 9, by providing a feedback amount in accordance with the position of tip W1s and the amount of curve of the tip, tip W1s can be moved to hole TGH provided in target TG. In this case, when the hole depth of hole TGH is small, a problem is less likely to occur. However, when the hole depth of hole TGH is large or when the diameter of hole TGH is small and is not so different from the diameter of electric wire W1, it is necessary to move tip W1s with the orientation of tip W1s being matched with a predetermined orientation in which the electric wire can be inserted into the hole. Specifically, it is necessary to move tip W1s along a direction in which a central axis TG-A of hole TGH extends.

Figure 10:
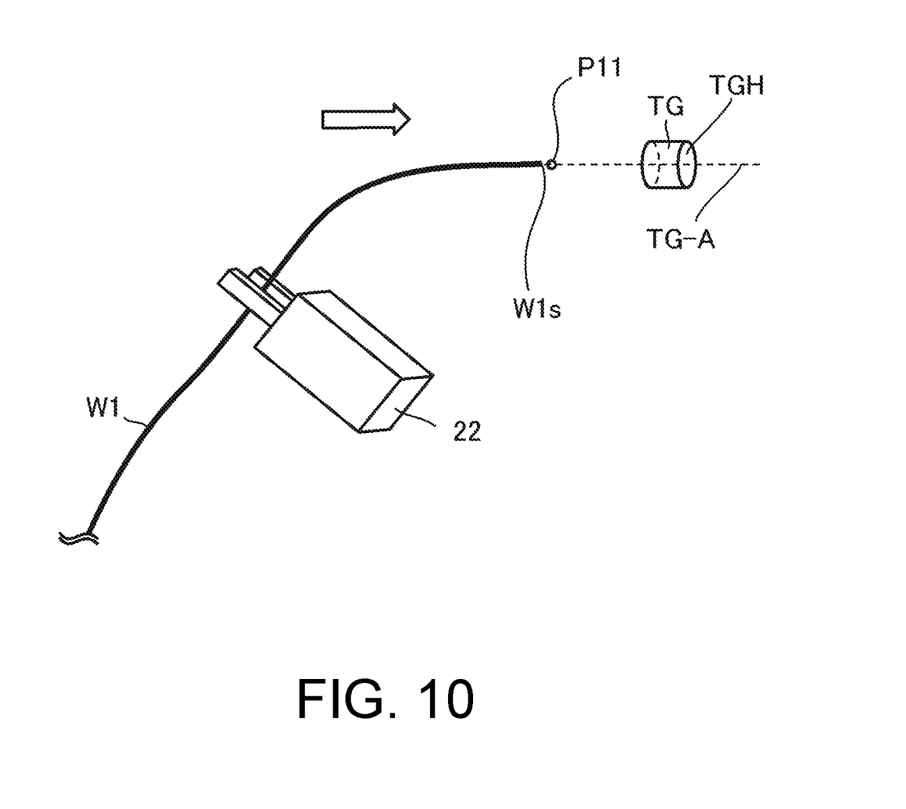
FIG. 10 is a schematic diagram illustrating another method for moving a tip of a line-like object in the embodiment.

Therefore, as shown in FIG. 10, a front position P11 is determined in advance to be located on an extension line of central axis TG-A of hole TGH, tip W1s is moved to front position P11 and is moved to match the orientation of the tip of electric wire W1 with the direction of central axis TG-A of hole TGH.

Tip W1s may be moved in the following manner: while moving tip W1s to front position P11, the orientation of tip W1s is matched therewith; or after tip W1s is moved to the front position in parallel, tip W1s may be turned at the front position to match the orientation of tip W1s therewith. The front position is preferably near the target position. When the target position is a hole, the front position is preferably located on a line on which the central axis of the hole extends. When the target position is a groove, the front position is preferably located just above the groove. When the target position is a terminal block, the front position is preferably located on a line extending, in a direction in which a terminal is connected, from a position to which the terminal is connected.

Thereafter, by moving tip W1s along the line on which central axis TG-A extends, tip W1s can be inserted into hole TGH even when the hole depth of hole TGH is large or the diameter of hole TGH is small.

It should be noted that when the insertion of electric wire W1 into hole TGH is found to be failed as a result of determination by a sensor or the like as to whether electric wire W1 is inserted therein, electric wire W1 may be returned to front position P11, the position and orientation of tip W1s of electric wire W1 may be measured again, the orientation of the tip of electric wire W1 may be matched with the direction in which center axis TG-A of hole TGH extends, and tip W1s may be moved into hole TGH.

The following describes a specific method for measuring the amount of curve of the tip of electric wire W1. For example, it is assumed that electric wire W1 with a length of 100 mm protrudes from robot hand 22.

[Teaching of Target Position]

The coordinates of the target position in the robot coordinate system are registered in advance. Robot hand 22 is controlled to grasp a straight bar B of 100 mm (see FIG. 9), rather than electric wire W1. Since robot hand 22 grasps an appropriate position thereof, the protrusion length of bar B is 100±several mm. This bar B has the same diameter as that of the electric wire. Thereafter, bar B is scanned by the three-dimensional camera.

Then, the relative coordinates of the tip of bar B from robot hand 22 can be calculated. This is held as reference data such as P1, for example.

The tip of the bar is moved to the position of the hole in which electric wire W1 is to be inserted. The tip position of the bar when moved corresponds to the target position. The target position may be set to inside of the hole or may be set to a vicinity of the entrance of the hole. The coordinates of the tip of the moved bar in the robot coordinate system are registered as the target position. This can be calculated by adding P1 to the coordinates of the robot hand. This position is registered as P0. In this way, the teaching of the target position is completed.

[Movement of Electric Wire]

Robot hand 22 is controlled to grasp electric wire W1 to be moved. Thereafter, electric wire W1 is scanned by the three-dimensional camera.

The relative coordinates from robot hand 22 to tip W1s of electric wire W1 can be calculated. Assuming the relative coordinates as, for example, P2, a vector calculated by P0-P2 is notified to the robot as a movement vector and the robot moves the electric wire.

In this way, the position of tip W1s is matched with the position of hole TGH.

[Movement of Electric Wire+Change of Direction]

Here, P2 represents the coordinates of the tip. Hence, by calculating the direction (Rx, Ry, Rz) of the tip at the same time as P2, the direction in which central axis TG-A of hole TGH extends and the direction in which the tip of electric wire W1 extends can be matched with each other as described above. As described above, tip W1s may be moved in the following manner: tip W1s is moved, in parallel, to front position P11 determined in advance; at front position P11, the tip of electric wire W1 is turned to match the orientation of the tip of electric wire W1 with the direction of center axis TG-A of hole TGH; and then tip W1s is moved along the line on which center axis TG-A extends. Alternatively, tip W1s may be moved in the following manner: with no front position P11 being determined, the tip of electric wire W1 may be moved from an initial position to hole TGH while turning the tip of electric wire W1 to match the direction in which the tip of electric wire W1 extends with the direction in which central axis TG-A of hole TGH extends. Tip W1s of line-like object W1 may be moved in any manner as long as tip W1s of line-like object W1 is moved to the predetermined position to match the orientation of tip W1s with the predetermined direction when tip W1s reaches target position P0.

As an example of conveying the line-like object to the predetermined position, it has been described that tip W1s of electric wire W1 serving as the line-like object is inserted into hole TGH provided in target TG; however, the line-like object and the target position are not limited thereto. Specific examples of the target position corresponding to the hole include respective predetermined positions in an inspection device for inspecting the tip of an electric wire, a wire stripper for stripping the coating of an electric wire, a processing machine for connecting an electric wire to a connector, a processing device for crimping a crimp terminal to the tip of an electric wire, and the like.

As another example, for example, when a wiring is soldered onto a substrate, it is necessary to control the orientation of the solder in accordance with the orientation of the wiring and the positions of other components. In this case, the present invention can be used by employing the solder as the line-like object and setting the target position to a predetermined portion of the substrate to which the solder is to be applied or a vicinity of a position just above the predetermined portion of the substrate.

Moreover, when an electric wire having a terminal is moved to a terminal block, there is a restriction in a direction in which the terminal is connected to the terminal block. Hence, the electric wire having the terminal needs to be moved to match the orientation of the electric wire with a predetermined orientation in which the electric wire is connected to the terminal block. In this case, the present embodiment can be used by employing the electric wire having the terminal as the line-like object and setting the predetermined portion of the terminal block or the vicinity of the predetermined portion of the terminal block as the target position. As described above, the target position is not limited to the hole, and may be a predetermined inspection position, a processing operation position, a surface, a groove, or a predetermined portion in the vicinity of a position just above each of these positions.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A method for moving a tip of a line-like object grasped by a robot hand to a target position, wherein the target position is a hole, and the line-like object has a curved tip, the method comprising:

measuring a position of the tip of the line-like object grasped by the robot hand and measuring an orientation of the tip;

moving the tip to the target position based on the measured position of the tip;

matching the orientation of the tip with a direction of a central axis the hole based on the measured orientation of the tip; and inserting the tip into the hole by moving the tip along the direction of the central axis of the hole with the orientation of the tip matched with the direction of the central axis of the hole.

2. The method for moving the tip of the line-like object according to claim 1, wherein the orientation of the tip is determined based on a shape of the line-like object from the tip to a position of the line-like object at a predetermined distance.

3. The method for moving the tip of the line-like object according to claim 1, wherein the moving of the tip to the target position includes moving the tip to pass through a predetermined front position with an orientation of the tip at the front position being matched with the direction of the central axis of the hole.

4. A controller for controlling movement of a line-like object to a target position by a robot hand provided in a robot, wherein the target position is a hole, the line-like object has a curved tip, the controller is configured to obtain a three-dimensional shape of the line-like object from a three-dimensional camera that obtains the three-dimensional shape of the line-like object, the controller is configured to obtain a position of a tip of the line-like object and an orientation of the tip from the three-dimensional shape, and the controller is configured to notify, to the robot having the robot hand, information for inserting the tip into the hole which comprises matching the orientation of the tip with a direction of a central axis of the hole, moving the tip to the central axis of the hole, and moving the tip along the direction of the center axis of the hole with the orientation of the tip matched with the direction of the central axis of the hole based on the position of the tip of the line-like object and the orientation of the tip.

5. A three-dimensional camera that obtains a three-dimensional shape of a line-like object, the three-dimensional camera being used to control movement of the line-like object by a robot hand provided in a robot, wherein the three-dimensional camera comprises the controller as claimed in claim 4.

* * * * *